US010439228B2

(12) United States Patent
Zhou et al.

(10) Patent No.: US 10,439,228 B2
(45) Date of Patent: Oct. 8, 2019

(54) METHOD FOR FORMING NOBLE METAL NANOPARTICLES ON A SUPPORT

(71) Applicant: NANYANG TECHNOLOGICAL UNIVERSITY, Singapore (SG)

(72) Inventors: Weijiang Zhou, Singapore (SG); Miao Li, Singapore (SG); Siew Hwa Chan, Singapore (SG)

(73) Assignee: Nanyang Technological University, Singapore (SG)

( * ) Notice: Subject to any disclaimer, the term of this patent is extended or adjusted under 35 U.S.C. 154(b) by 537 days.

(21) Appl. No.: 14/899,956

(22) PCT Filed: Jul. 18, 2014

(86) PCT No.: PCT/SG2014/000338
§ 371 (c)(1),
(2) Date: Dec. 18, 2015

(87) PCT Pub. No.: WO2015/016773
PCT Pub. Date: Feb. 5, 2015

(65) Prior Publication Data
US 2016/0141630 A1    May 19, 2016

Related U.S. Application Data

(60) Provisional application No. 61/861,108, filed on Aug. 1, 2013.

(51) Int. Cl.
*H01M 4/92* (2006.01)
*H01M 4/88* (2006.01)
(Continued)

(52) U.S. Cl.
CPC ......... *H01M 4/8825* (2013.01); *B22F 1/0018* (2013.01); *B22F 9/24* (2013.01);
(Continued)

(58) Field of Classification Search
CPC ............ H01M 4/88; H01M 4/90; H01M 4/92; H01M 4/926; H01M 4/8825;
(Continued)

(56) References Cited

U.S. PATENT DOCUMENTS 3,992,331 A    11/1976   Petrow et al.
4,044,193 A    8/1977    Petrow et al.
(Continued)

FOREIGN PATENT DOCUMENTS

CN    2386877 Y    7/2000
CN    1577928   *  2/2005
(Continued)

OTHER PUBLICATIONS

CN 2386877 MT.*
(Continued)

*Primary Examiner* — Alexander Usyatinsky
(74) *Attorney, Agent, or Firm* — Alston & Bird LLP

(57) ABSTRACT

Provided is a method for forming noble metal nanoparticles on a support. In particular, the method includes heating precursors of the noble metal nanoparticles in a spiral glass tube reactor to reduce the precursors to form the noble metal nanoparticles on the support.

16 Claims, 6 Drawing Sheets

(51) Int. Cl.
  *H01M 4/90*    (2006.01)
  *B22F 1/00*    (2006.01)
  *B22F 9/24*    (2006.01)
  *H01M 8/1018*  (2016.01)

(52) U.S. Cl.
  CPC ........... *H01M 4/9041* (2013.01); *H01M 4/92* (2013.01); *H01M 4/926* (2013.01); *H01M 2008/1095* (2013.01); *H01M 2250/20* (2013.01); *Y02T 90/32* (2013.01)

(58) Field of Classification Search
  CPC ....... H01M 4/9041; H01M 2008/1095; H01M 2250/20; B22F 1/0018; B22F 9/24
  See application file for complete search history.

(56) References Cited

U.S. PATENT DOCUMENTS

| | | | |
|---|---|---|---|
| 5,641,723 | A | 6/1997 | Bonnemann et al. |
| 5,759,944 | A | 6/1998 | Buchanan et al. |
| 6,686,308 | B2 * | 2/2004 | Mao .................. B01J 23/42 419/11 |
| 6,689,505 | B1 * | 2/2004 | Albers ................ B01J 21/18 429/480 |
| 7,713,902 | B2 | 5/2010 | Yi et al. |
| 2005/0009696 | A1 * | 1/2005 | Mao .................. B01J 23/42 502/325 |
| 2010/0155310 | A1 | 6/2010 | Enomura |
| 2012/0149545 | A1 | 6/2012 | Takahashi et al. |

FOREIGN PATENT DOCUMENTS

| | | | |
|---|---|---|---|
| CN | 1577928 | A | 2/2005 |
| CN | 2386877 | * | 7/2007 |
| CN | 102327771 | * | 1/2012 |
| CN | 102327771 | A | 1/2012 |
| CN | 102516809 | A | 6/2012 |
| WO | WO 2008/048192 | A1 | 4/2008 |
| WO | WO 2011/116169 | A2 | 9/2011 |

OTHER PUBLICATIONS

CN 1577928A MT.*
Sakthivel et al. Journal of Power Sources 195 (2010) 7083-7089.*
CN102327771 (Year: 2012).*
Journal of Catalysis 280 (2011) 145-149 (Year: 2011).*
Extended European Search Report from European Patent Application No. 14832120.1 dated Mar. 23, 2017, 8 pages.
Office Action for Chinese Patent Application No. 201480043312.9 dated May 4, 2017, with English language translation, 13 pages.
International Search Report and Written Opinion for Application No. PCT/SG2014/000338 dated Oct. 1, 2014.
Antolini, E., *Review Formation, Microstructural Characteristics and Stability of Carbon Supported Platinum Catalysts for Low Temperature Fuel Cells*, Journal of Materials Science, 38 (2003) 2995-3005.
Bonnemannn, H. et al., *Formation of Colloidal Transition Metals in Organic Phases and Their Application in Catalysis*, Angew. Chem. Int. Ed. Engl. 30, No. 10 (1991) 1312-1314.
Li, W. et al., *Platinum Nanopaticles Supported on Stacked-Cup Carbon Nanofibers as Electrocatalysts for Proton Exchange Membrane Fuel Cell*, Carbon 48 (2010) 995-1003.
Sakthivel et al., *Microwave Assisted Synthesis of Surfactant Stabilized Platinum/Carbon Nanotube Electrocatalysts for Direct Methanol Fuel Cell Applications*, Journal of Power Sources, vol. 195 (2010) 7083-7089.
Watanabe, M. et al., *Preparation of Highly Dispersed Pt + Ru Alloy Clusters and the Activity for the Electrooxidation of Methanol*, J. Electroanal. Chem., 229 (1987) 395-406.
Williams, M. C., *Status and Promise of Fuel Cell Technology*, Fuel Cells, 1, No. 2(2001) 87-91.
Zhang, W. et al., *Microwave-Assisted Synthesis of Pt/CNT Nanocomposite Electrocatalysts for PEM Fuel Cells*, Nanoscale, 2 (2010) 282-286.
Office Action for Chinese Patent Application No. 201480043312.9 dated Feb. 26, 2018, with English language translation, 9 pages.
Office Action for European Application No. 14 832 120.1 dated Jun. 27, 2019, 5 pages.
Burton, P. D. et al., *Facile, Surfactant-Free Synthesis of Pd Nanoparticles for Heterogeneous Catalysts*, Journal of Catalysis 280 (2011) 145-149.

* cited by examiner

METHOD FOR FORMING NOBLE METAL NANOPARTICLES ON A SUPPORT

CROSS-REFERENCE TO RELATED APPLICATION

The present application is a national phase entry of PCT/SG2014/000338, filed on Jul. 18, 2014, which claims the benefit of priority of U.S. Provisional Patent Application No. 61/861,108 filed on Aug. 1, 2013, the contents of which being hereby incorporated by reference in its entirety for all purposes.

TECHNICAL FIELD

The invention relates to a method for forming noble metal nanoparticles on a support. In particular, the method includes heating precursors of the noble metal nanoparticles in a spiral glass tube reactor to reduce the precursors to form the noble metal nanoparticles on the support.

BACKGROUND

Fuel cells can convert chemical energy resulting from the oxidation of fuels directly into electrical energy and are considered to be one of the most important clean energy conversion devices. Currently, low-temperature fuel cell research is quite active particularly in automobile-related fields, backup power, portable and mobile power source because low-temperature fuel cells have advantages in improved fuel efficiency, reduced emission, and more environmentally friendly compared to their internal combustion engines counterpart.

Proton exchange membrane fuel cells (PEMFCs, including direct methanol/ethanol fuel cells, DMFCs) are characterized in that a wide operating temperature range from $-20°$ C. to $180°$ C. (depending on the solid electrolyte properties), quick start-up and response, and high output power density which allows PEMFCs system to be readily smaller and lighter. PEMFCs are very suitable to be the power source for an automobile, unmanned aerial vehicle (UAV), auxiliary power units (APU), mobile market, portable, small stationary power applications, or a power supply for a small cogeneration system such as a combined heat and power (CHP) system.

The core of PEMFCs is membrane-electrode assembly (MEA) which is composed of a solid electrolyte sandwiched in between two catalytic electrodes. The electrode used generally contains a catalyst layer, a macro-porous layer and a backing layer. The catalyst layer can be fixed directly on solid electrolyte, or supported on backing layer. Currently, PEMFCs employ noble metals especially scarce platinum or its alloy supported on carbon materials as electrode catalysts to promote the reactions of fuel electro-oxidation and oxygen reduction. In current hydrogen-fed PEMFCs, around 75% of precious metal is used as a cathode catalyst to accelerate the sluggish oxygen reduction reaction. Hence, it is imperative to reduce or eliminate the use of platinum in the cathode, which would lead to a more affordable fuel cell system as a whole and is made possible for large volume commercialization.

In order for the fuel oxidation and oxygen reduction reactions in a fuel cell to occur at desired electrochemical kinetic rates and potentials, highly active and durable electro-catalysts are required. Due to the high catalytic nature of platinum and its chemical stability, platinum and platinum alloy materials, supported or unsupported, are preferred as electro-catalyst for the anode and cathodes in low-temperature fuel cells.

Generally, to reduce the impact of costly platinum, conductive materials such as carbon and its derivatives are used to support platinum-based catalysts, which can also help to improve the stability and the dispersion of noble metals. There are two ways to reduce the electrode catalyst cost, which would lead to a reduction in the cost of a PEMFC stack as a whole. One way is to employ non-precious metal catalysts or non-metallic catalysts, which is more attractive and interesting. Another way is to decrease the Pt loading to increase the cost-effectiveness. Although, researchers are striving to improve the quality of the catalysts, the current use of non-precious metal catalysts is still limited by the limited activity in the acidic environment of solid polymer proton conducting electrolyte. Due to this reason, non-platinum catalysts that were developed have little opportunity to replace platinum-based catalysts at least not in the foreseeable future.

Alloying platinum with various less-expensive materials is one of the possible avenues to either reduce the amount of platinum required or increase the total activity of electro-catalysts, or both. Recently, platinum-based nanostructures such as platinum thin shells capped cheap metallic cores or metal-oxide cores were also suggested to reduce the use of platinum and increase the catalytic activity. Successive reduction procedures or in-situ displacement reactions are always used to achieve the core-shell nano-catalysts. Generally, it is believed that the interaction between the shell metal and core metals/oxides can enhance the activity and durability to some extent.

The reduced noble metallic particle sizes, on the other hand, can produce more surface active sites and can therefore increase the available reaction sites in the electrode's catalyst layer or the so-called three-phase boundaries. Various methods have been reported to prepare supported Pt or Pt-based catalysts with high metallic loading.

U.S. Pat. No. 7,713,902 reported a procedure in which lauric acid was used as a surfactant, and mesoporous alumina as template to prepare highly dispersed platinum. The resulting platinum particle size achieved with this method was ranging from 1.0 to 2.4 nm in diameter. In this patent, the procedure described needs to be carried out in butanol-water solution, and the catalyst activity was enhanced compared to the commercial E-TEK catalyst.

In U.S. Pat. No. 5,759,944, metals were deposited by suspension of the support material in water, subsequently hydrolysis or precipitation of the corresponding noble metal salts and non-noble metal salts with aqueous reducing agent such as formaldehyde was carried out. In this procedure, a heat treatment was needed for the synthesized samples such as Pt, PtNi and PtNiAu in an inert or reducing atmosphere.

U.S. Pat. No. 6,689,505 employed a home-made carbon black containing an H-content of greater than 4,000 ppm to synthesize the supported platinum catalyst. The resulting nanoparticle size was around 4.4 nm, which was carried out in aqueous solution at pH of 9. It was claimed that the H-content was helpful to the deposition of particle and activity improvement.

Support pre-treatment or functionalization can also play an important role in reducing the particle size of noble platinum and immobilizing metallic nanoparticles on support surface. US Patent Publication No. 2012/0149545 demonstrated that ammonia treatment of carbon carriers can reduce platinum particles to 1.28 nm on treated carbon powder from 2.26 nm on non-treated carbon powder with a 20 wt % platinum loading. The big increase in surface area results in larger electrochemical surface areas of platinum and the big improvement of activity.

Lin et al. presented in PCT Patent Publication No. 2008/048192 a method to functionalize carbon materials as carriers to support noble nanoparticles. The typical functional groups introduced in that invention were mainly the oxygen-containing radicals such as: —COOH (carboxyl), —CHO (aldehyde), —CO— (carbonyl), —O— (oxo) and —OH (hydroxyl). These surface oxygen-containing radicals can assist in immobilization of metallic precursors and therefore the dispersion of reduced metal particles. With this method, nanoparticle sizes of noble metal can be reduced with sparse surface particle density.

Therefore, there remains a need to provide for improved methods for preparing noble metal nanoparticles suitable for use as a catalyst for fuel cell applications, for example.

SUMMARY

Present inventors have designed a feasible and facile procedure to synthesize ultrafine nanosized noble metal or noble metal-based catalysts with high metal loading and high surface particle density. In various embodiments, the noble metal may be platinum. The procedure is scalable for mass production of supported or unsupported ultrafine nanosized platinum or platinum-based catalysts with high metal loading, or other metallic nanoparticles.

In one aspect of the invention, there is provided a method for forming noble metal nanoparticles on a support. The method includes mixing a support ink with one or more noble metal precursor solution. The support ink includes a solution of a first polyhydric alcohol and the support. The one or more noble metal precursor solution includes a solution of a second polyhydric alcohol and the one or more noble metal precursor. The method further includes feeding the mixture of the support ink and the one or more noble metal precursor solution to a spiral glass tube reactor. The method further includes heating the spiral glass tube reactor containing the mixture of the support ink and the one or more noble metal precursor solution to reduce the noble metal precursor to form noble metal nanoparticles on the support.

Another aspect of the invention relates to noble metal nanoparticles supported on a support. The average noble metal nanoparticle size is 2.0 nm or below, preferably about 1.8 nm. The noble metal loading based on the total mass of the noble metal nanoparticles and the support can be 40 wt % or more, preferably about 75 wt % or more.

A further aspect of the invention relates to the use of the supported noble metal nanoparticles as a catalyst layer in an electrode for fuel cell applications.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, chemical and other changes may be made without departing from the scope of the invention. The various embodiments are not necessarily mutually exclusive, as some embodiments can be combined with one or more other embodiments to form new embodiments.

A feasible and facile method to synthesize ultrafine nanosized noble metal or noble metal-based catalysts having a high metal loading and a high surface particle density is herein disclosed. The method involves a rapid and consecutive flow reduction which can save power, time and preparation cost. Such method further affords controllable and localized heating which can further save energy and improve effectiveness of the chemical reduction process. The total metal loading of the as-formed catalysts can be as high as 75% of total catalyst mass. The average metal nanoparticle size is about 1.8 nm with narrow distribution and the specific mass surface area of the noble metal, say platinum, can be as high as 151.0 $m^2/g$. No expensive and cumbersome surfactants are needed for the reduction step, therefore making the synthesis method economically attractive.

Figure 1:
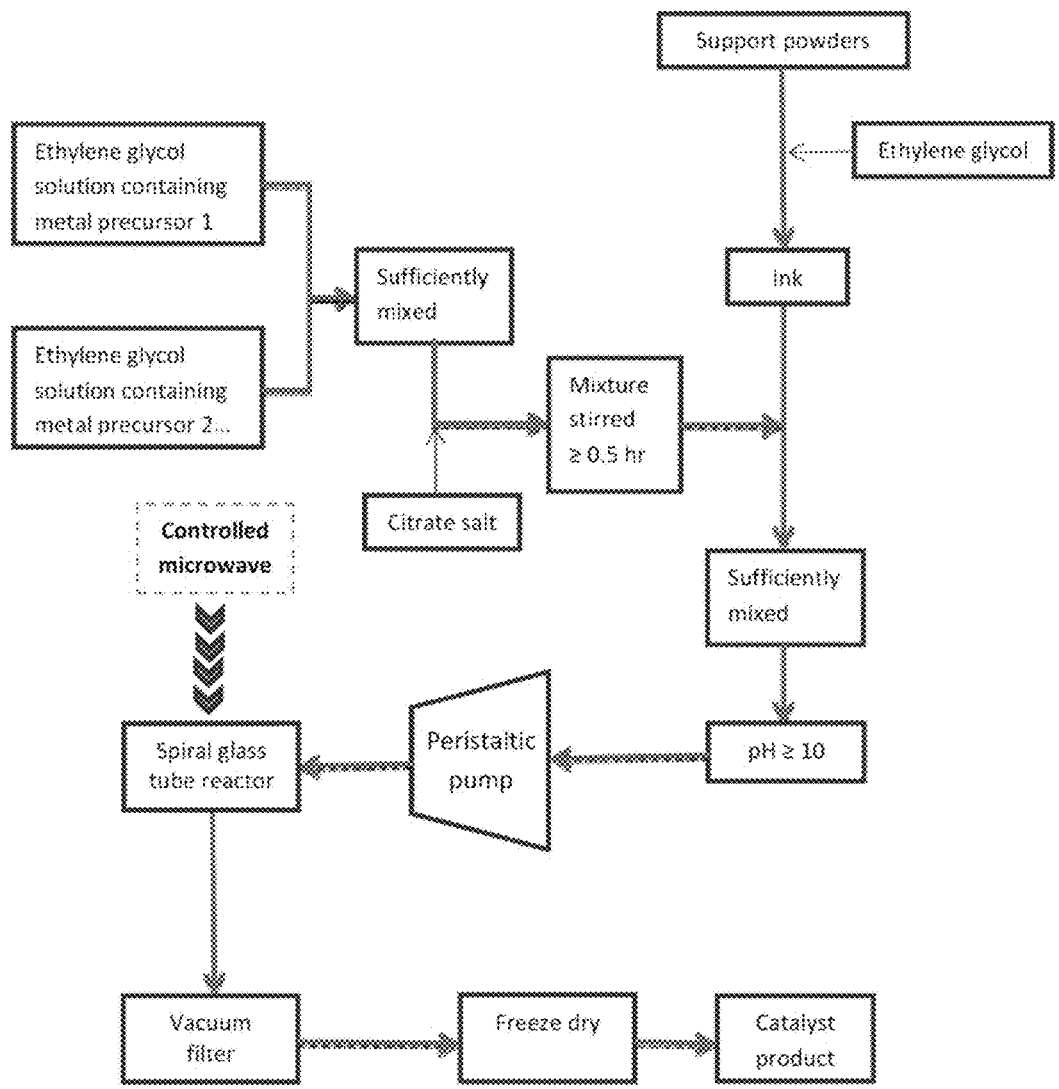
FIG. 1 shows a flow chart of present preparation procedure for ultra-fine nanosized catalysts.

Accordingly, in one aspect of the invention, there is provided a method for forming noble metal nanoparticles on a support as illustrated in FIG. 1.

A "nanoparticle" refers to a particle having a characteristic length, such as diameter, in the range of up to 100 nm. Examples of a noble metal include platinum, ruthenium, palladium, gold, silver, rhenium, rhodium, iridium, osmium, or a combination thereof.

In some embodiments, the noble metal nanoparticles are nanoparticles comprising or consisting essentially of platinum.

In one embodiment, the noble metal nanoparticles are platinum nanoparticles.

The noble metal nanoparticles may have a regular shape, or may be irregularly shaped. For example, the noble metal nanoparticle may be a sphere, a rod, a cube, or irregularly shaped. The size of the noble metal nanoparticles may be characterized by their mean diameter. The term "diameter" as used herein refers to the maximal length of a straight line segment passing through the center of a figure and terminating at the periphery. The term "mean diameter" refers to an average diameter of the nanoparticles, and may be calculated by dividing the sum of the diameter of each nanoparticle by the total number of nanoparticles. Although the term "diameter" is used normally to refer to the maximal length of a line segment passing through the centre and connecting two points on the periphery of a nanosphere, it is also used herein to refer to the maximal length of a line segment passing through the centre and connecting two points on the periphery of nanoparticles having other shapes, such as a nanocube or a nanotetrahedra, or an irregular shape.

As mentioned above, the present method affords the synthesis of noble metal nanoparticles having mean diameter of about 2 nm or less, such as about 1.9 nm, 1.8 nm, 1.7 nm, or even less, with narrow distribution.

In one embodiment, the mean diameter of the noble metal nanoparticles, such as platinum nanoparticles, is about 1.8 nm.

In various embodiments, the noble metal nanoparticles are essentially monodisperse.

By "support" when used in connection with the noble metal nanoparticles is meant a supporting structure or a supporting material for supporting the noble metal nanoparticles. Generally, any support capable of supporting and providing adequate dispersion for the noble metal nanoparticles may be used. The support is preferably stable in the local environment where the noble nanoparticles are to be used, for example as a catalyst layer in an electrode for low temperature fuel cell applications. The support preferably has a specific surface area and/or porosity sufficient to provide dispersion of the noble metal nanoparticles.

In various embodiments, the support may include one or more carbon material selected from the group consisting of carbon black, carbon nanotube, carbon fibre, graphene, graphite, and carbon mesosphere.

In preferred embodiments, the carbon support containing one or more carbon materials may include carbon materials treated by oxidizing or doping of other elements including nitrogen, sulphur, boron, halogens, and hydrogen. The treatment also includes the heat treatment in reducing atmosphere and/or inert atmosphere, solution, and surface functionalization by various chemicals before use.

In one embodiment, the support comprises carbon black.

In another embodiment, the support comprises carbon nanotube.

In yet another embodiment, the support comprises graphene.

In one embodiment, the support has surface area ranging from 20 to 3,000 $m^2/g$.

The method includes mixing a support ink with one or more noble metal precursor solution. In FIG. 1, it is illustrated as an example two separate (and different type) noble metal precursor solutions are mixed together. It is to be understood that in certain embodiments, only one noble metal precursor solution is used while in other embodiments, two, three, four, or even more (different type) noble metal solutions are mixed.

By "mixing" is meant contacting one component with another component. The order of mixing is generally not critical, unless stated otherwise. For example, a first noble metal precursor solution may be mixed with a second noble metal precursor solution before adding a third noble metal precursor. Alternatively, all three noble metal precursor solutions may be simultaneously added to and therefore mixed in a common container.

In one embodiment, the mixture of the support ink and the one or more noble metal precursor solution is conducted by intense agitation or ultrasonic agitation. The agitation is kept until all of mixture is used up.

The support ink includes a solution of a first polyhydric alcohol and the support.

In various embodiments, the solution of the first polyhydric alcohol comprises one or more polyhydric alcohol and water.

In certain preferred embodiments, the solution of the first polyhydric alcohol includes ethylene glycol and water. Preferably, the water content in the solution of the first polyhydric alcohol ranges from zero to 85% volume.

The one or more noble metal precursor solution includes a solution of a second polyhydric alcohol and the one or more noble metal precursor.

In various embodiments, the solution of the second polyhydric alcohol and the solution of the first polyhydric alcohol are the same and as discussed above.

In various embodiments, the one or more noble metal precursor comprises an oxide, a halide, a nitrite, a sulphate, or a complex of platinum, ruthenium, palladium, gold, silver, rhenium, rhodium, iridium, osmium, or a combination thereof.

In one embodiment where the noble metal nanoparticles comprise platinum nanoparticles, the precursor solution comprises hexachloroplatinic acid ($H_2PtCl_6.6H_2O$).

In various embodiments, as illustrated in FIG. 1, prior to mixing the support ink with the one or more noble metal precursor solution, the one or more noble metal precursor solution is first mixed with a polybasic carboxylic acid.

In various embodiments, the polybasic carboxylic acid comprises citric acid, tartaric acid, malic acid, oxalic acid, or their salts.

In preferred embodiments, the polybasic carboxylic acid comprises citric acid or a citrate of sodium or potassium. The molar ratio of citrate to total metals is generally ranging from 0.001 to 50.

It has been found that the addition of citrate acid or other polybasic carboxylic acids to the one or more noble metal precursor solution prior to mixing with the support ink aids in achieving formation of a uniformly dispersed noble metal nanoparticles on the support later.

The method further includes feeding the mixture of the support ink and the one or more noble metal precursor solution to a spiral glass tube reactor. The mixture may be fed to the spiral glass tube reactor by a pump, such as a peristaltic pump.

Figure 2:
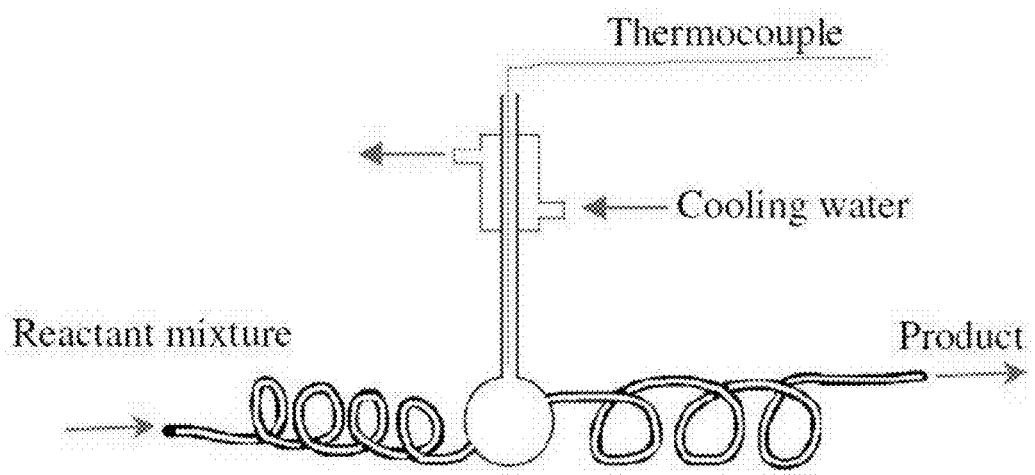
FIG. 2 shows a diagrammatic sketch of present designed reaction glass vessel.

In various embodiments, the diameter of the spiral glass tube reactor is in a range of about 1 cm to 10 cm, preferably, about 2, 3, 4, or 5 cm. The spiral glass tube reactor is specially designed and aimed with a safety valve and thermocouple. The liquid in the spiral glass tube is heated by microwave where noble metal precursors are reduced and deposited on support particles. FIG. 2 shows an example of a spiral glass ture reactor suitable for use in the present invention.

In certain embodiments, the method further comprises adding a base solution to the mixture of the support ink and the one or more noble metal precursor solution prior to feeding the mixture to the spiral glass tube reactor. This will increase the pH of the mixture to above 7, such as 7.5, 8, 8.5, 9, 9.5, 10, 10.5, or even higher.

The base solution may include a hydroxide of sodium or potassium, preferably sodium hydroxide.

The method further includes heating the spiral glass tube reactor containing the mixture of the support ink and the one or more noble metal precursor solution to reduce the noble metal precursor to form noble metal nanoparticles on the support.

By "heating" is meant that the temperature of the mixture of the support ink and the one or more noble metal precursor solution is deliberately raised such that the reduction process can take place.

By introducing the mixture into a spiral glass tube reactor, a continuous flow-reduction heating is achieved whereby only a small region is selectively heated. Thus, a continuous flow of small amount of mixed reactants is heated and chemically reduced simultaneously in a very small time frame. This leads to complete (i.e. energy savings) and uniform heat treatment of the noble metal nanoparticles, which is crucial in large volume production. It also enables the reduction of the noble metal nanoparticles and their uniform distribution of nanoparticles on the surface of supports. Advantageously, smaller particle size (1.8 nm) with narrow size distribution and a high metal loading (75 wt %) are achieved (see Examples section below).

In various embodiments, heating comprises exposing the spiral glass tube reactor to microwave heat or millimeter waves. The microwave heat is tune-able and therefore controllable.

Preferably, the heating comprises exposing the spiral glass tube reactor to microwave heat at 100° C. to 200° C., such as 100° C., 110° C., 120° C., 130° C., 140° C., 150° C., 160° C., 170° C., 180° C., 190° C., or 200° C.

In one embodiment, the heating comprises exposing the spiral glass tube reactor to microwave heat at 150° C.

After reducing the noble metal precursors to the noble metal nanoparticles on the support, separation of the thus-formed supported noble metal nanoparticles may be carried out by known techniques, for example, filtering and drying as shown in FIG. 1. In one illustration, the reduced mixture is led to a separation equipment such as vacuum filtration to separate the solid from liquid. After washing with copious deionized water, the filtered solid is freeze dried or dried in a vacuum oven overnight before it can be used directly or further treated.

The supported noble metal nanoparticles formed by the present method have demonstrated an average size of 2.0 nm or even less, such as 1.8 nm. Additionally, the noble metal loading based on the total mass of the noble metal nanoparticles and the support is 40 wt % and above, preferably 60 wt % and above, and in a case where the noble metal is platinum, a 75 wt % loading has been achieved.

The supported noble metal nanoparticles may be used as a catalyst layer in an electrode for low temperature fuel cell applications, for example.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

In order that the invention may be readily understood and put into practical effect, particular embodiments will now be described by way of the following non-limiting examples.

EXAMPLES

Materials used in the foregoing examples include:
Hexachloroplatinic acid ($H_2PtCl_6 \cdot 6H_2O$)
Sodium hydroxide (NaOH)
Ethylene glycol ($HOCH_2CH_2OH$)
Hydrochloric acid (HCl)
Citric acid monohydrate ($C_6H_8O_7 \cdot H_2O$)/salt citrate
Low cost metal salt such as nickel (II) nitrate ($Ni(NO_3)_2$), cobalt (II) chloride ($CoCl_2$)
Carbon powder (XC-72, Cabot)
Graphene (home-made)

Example 1

5.0 g of carbon powder (XC-72) was treated in 200 mL 5.0 M $HNO_3$ and 5.0 M HCl mixed aqueous solution by refluxing for 5 hours, separated, washed with copious DI water and then heated in oven at 120° C. overnight. The treatment can remove the impurity and enrich the support surface. The acid-treated carbon powder is labelled as XC-72R.

Example 2: Citrate Treated Carbon Powder 1.0 g of carbon black (XC-72R) and 1.0 g of citric acid monohydrate were mixed with 150 mL DI water with ultrasonic vibration to get highly dispersed carbon ink. After stirring for 2 hours, the mixed ink was dried to form a paste. The paste was placed in quartz boat and heated at 110° C. for 30 min in tube furnace. Then the solid was heated at 300° C. for another 30 min to get the citrate treated carbon powder which was labelled as XC-72RC.

Example 3

0.6 g of carbon powder (XC-72R) was dispersed in 60 mL ethylene glycol to make carbon ink. 1.08 g of hexachloroplatinic acid was dissolved in 100 mL ethylene glycol. The carbon ink was added into metallic precursor solution and adequately stirred for one and a half hour. NaOH was added into ethylene glycol to prepare 1.0 M solution and was used to change the above mixed ink pH level to 13. After adequate stirring, the mixed ink was heated to 150° C. and kept refluxing for 1 hour to get the metal precursor reduced adequately. The reduced black mixed slurry was centrifuged to separate the solid after pH level was adjusted in between 3 and 4 by HCl aqueous solution. The final catalyst Pt/C (40% wt.) was produced after the solid was dried in vacuum oven at 60° C. overnight. Catalyst produced by this procedure is labelled as Pt/C-a.

Example 4

0.6 g of carbon powder which is treated with citrate in Example 2 (XC-72RC) was dispersed in 60 mL ethylene glycol to make carbon ink. 1.08 g of hexachloroplatinic acid was dissolved in 100 mL ethylene glycol. The carbon ink was added into metallic precursor solution and adequately stirred for one and a half hour. NaOH was added into ethylene glycol to prepare 1.0 M solution and was used to change the above mixed ink pH level to 13. After adequate stirring, the mixed ink was heated to 150° C. and kept refluxing for 1, hour to get the metal precursor reduced adequately. The reduced black mixed slurry was centrifuged to separate the solid after pH level was adjusted in between 3 and 4 by HCl aqueous solution. The final catalyst Pt/C (40% wt.) was produced after the solid was dried in vacuum oven at 60° C. overnight. Catalyst produced by this procedure is labelled as Pt/C-b.

Example 5

0.6 g of carbon powder (XC-72R) was dispersed in 60 mL ethylene glycol to make carbon ink. 1.08 g of hexachloroplatinic acid was dissolved in 100 mL ethylene glycol and 1.6 g of citrate acid was dissolved in 50 mL ethylene glycol, respectively. Before the carbon ink was added, the citrate acid solution was mixed with metallic precursor solution and adequately stirred for one and a half hour. NaOH was added into ethylene glycol to prepare 1.0 M solution and was used to change the above mixed ink pH level to 13. After adequate stirring, the mixed ink was heated to 150° C. and kept refluxing for 1 hour to get the noble metal precursor reduced adequately. The reduced black mixed slurry was centrifuged to separate the solid after pH level was adjusted in between 3 and 4 by HCl aqueous solution. The final catalyst Pt/C (40% wt.) was produced after the solid was dried in vacuum oven at 60° C. overnight. Catalyst produced by this procedure is labelled as Pt/C-c.

Same procedures are also applied to synthesize carbon nanotube (CNT) and graphene supported platinum catalysts labelled as Pt/CNT and Pt/graphene, respectively.

Example 6: Catalyst Sample Characterization

Figure 3:
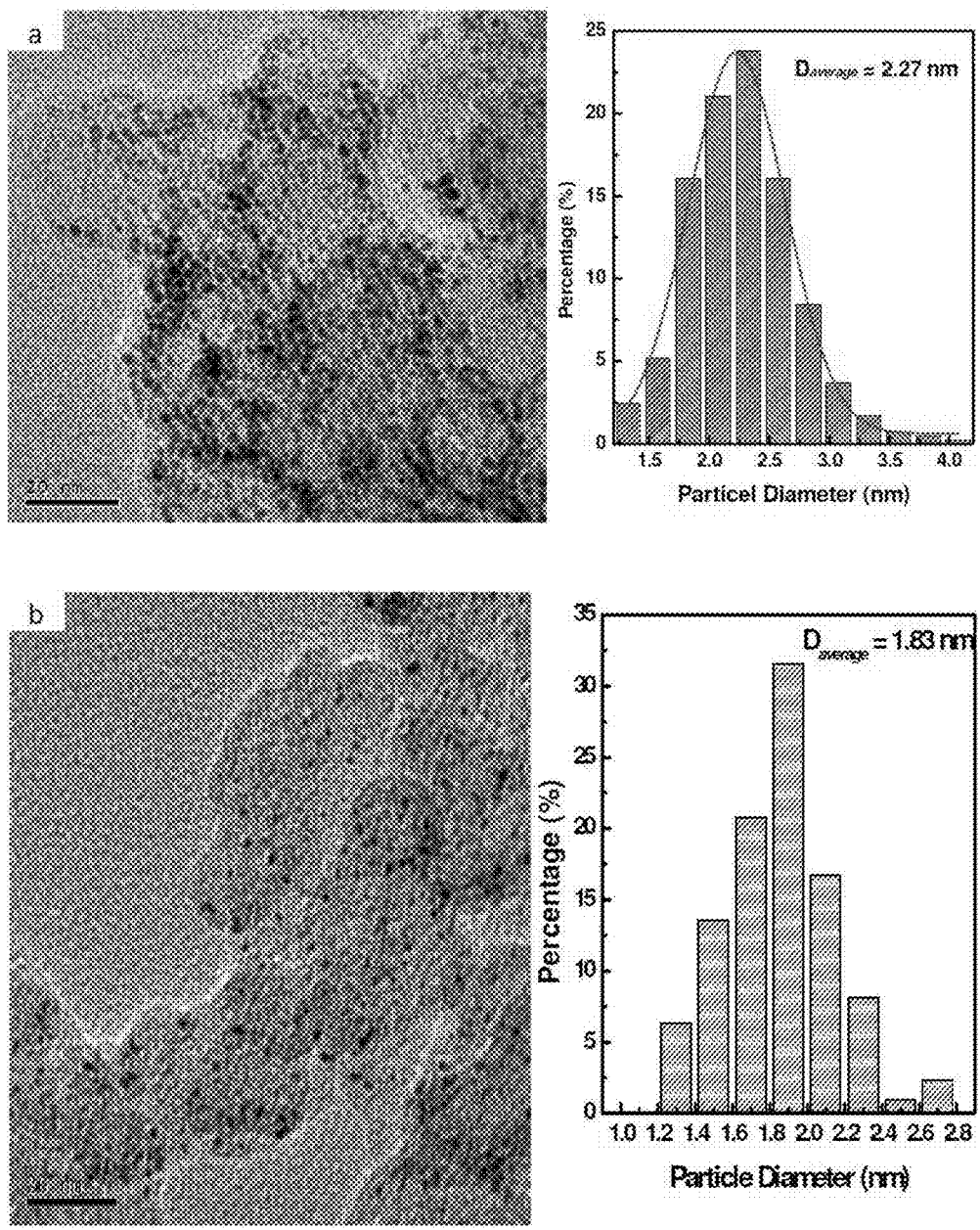
FIG. 3 shows TEM and particle size histogram of Pt supported on carbon powder samples (40 wt %): (a) Pt/C sample synthesized by common procedure; (b) Pt/C and the carbon powder is treated with citrate before used; (c) Pt/C synthesized by present method herein.
Figure 3:
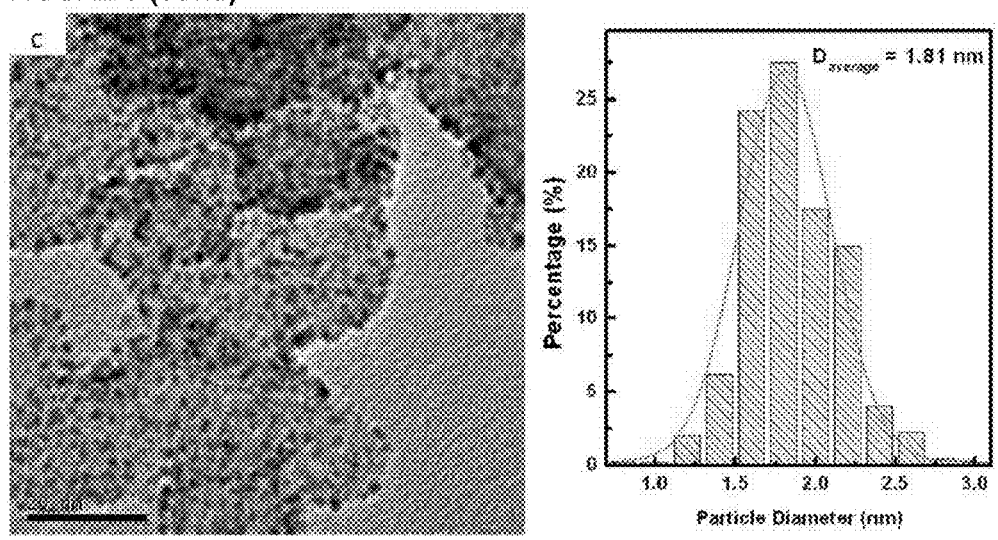

Samples synthesized with different procedures were characterized by Transmission Electron Microscope (TEM) and FIG. 3 shows the typical TEM pictures and the particle size histogram. Samples "a" was synthesized by the previous ethylene glycol procedure when no citrate was involved. The general feature shows that this sample has quite uniform particle distribution on support surface without aggregation. The particle size range is also narrow and the average particle size is 2.3 nm with 40% wt platinum loading.

From the TEM result of sample Pt/C-b, it can be seen that further treatment of carbon powder with citrate can indeed decrease the platinum particle size greatly, from 2.3 nm to 1.8 nm. The surface functionalization of carbon powder proves useful in improving the dispersion of metallic particles. However, it is also found that the particle number density on the carbon surface is quite low compared to the sample Pt/C-a. This indicates that the immobilized citrate group on carbon surface may play a role of a double-edged sword. For comparison, the catalyst sample disclosed in PCT Publication No. WO 2008/048192 has similar results, namely, sparse platinum particles found on the support surface (FIG. 1 of WO 2008/048192). The average particle size reported herein is much smaller than that disclosed in PCT Publication No. WO 2008/048192. Moreover, the latter has very low metallic content of only 16.3% wt.

Compared to sample Pt/C-b, the catalyst with the procedure disclosed herein, i.e. Pt/C-c has much more dense particles on the carbon surface. This indicates that most of platinum is reduced and deposited on the carrier surface. The specific mass surface area can reach 150 $m^2$/g Pt. The current procedure in this disclosure therefore has the advantages of full depositing of metallic particles and obviously increasing metal surface area.

Figure 4:
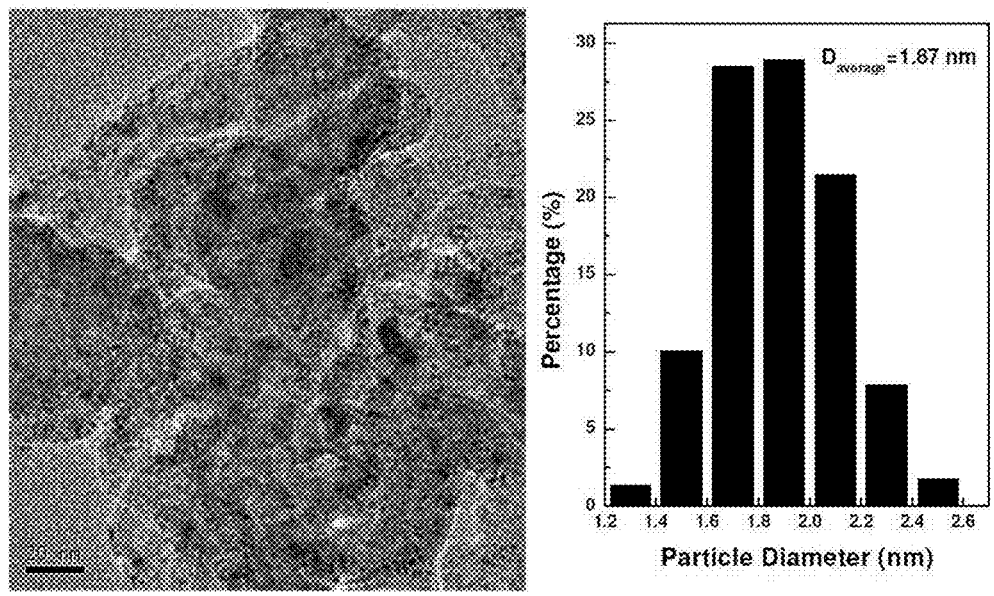
FIG. 4 shows TEM and particle size histogram of Pt samples supported on multi-wall CNT and graphene (40 wt %).
Figure 4:
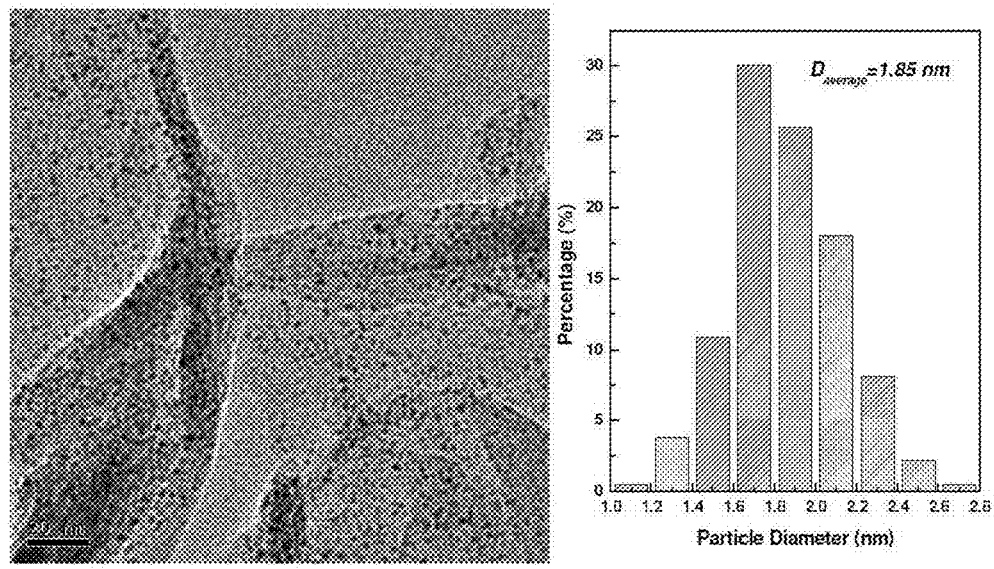
Figure 5:
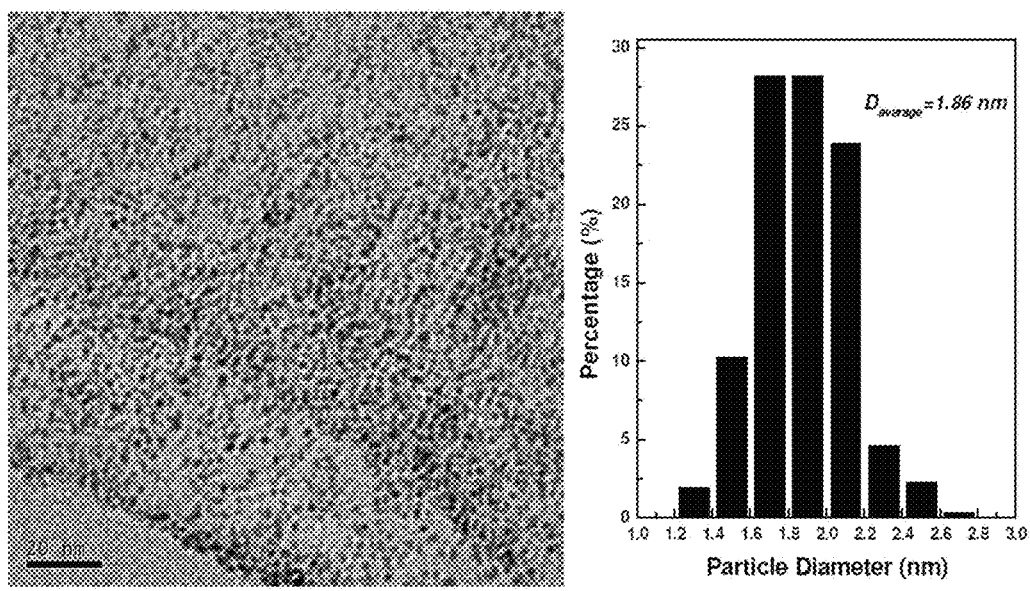
FIG. 5 shows TEM and particle size histogram of Pt/Graphene powder sample with Pt loading of 60 wt %.

FIG. 4 presents the TEM results of platinum particles supported on multi-walled CNT and graphene. It is amazing that the platinum particle sizes are almost the same even on different carriers with different surface area and structures. These results demonstrated the repeatability of the invention disclosed herein. The platinum loading on graphene was further increased from 40% wt to 60% wt and the TEM result is presented in FIG. 5. From this figure, one can see that the average particle size is still around 1.8 nm without any obvious increase in particle size compared to the sample containing 40% wt. of platinum. It is also found the particle sizes are quite uniform and the particle distribution on the support surface is also very homogeneous. Compared to the sample of 40% wt Pt/graphene, the platinum particle numbers per unit area is obviously increased. This result has proved the feasibility of the procedure described above.

Figure 6:
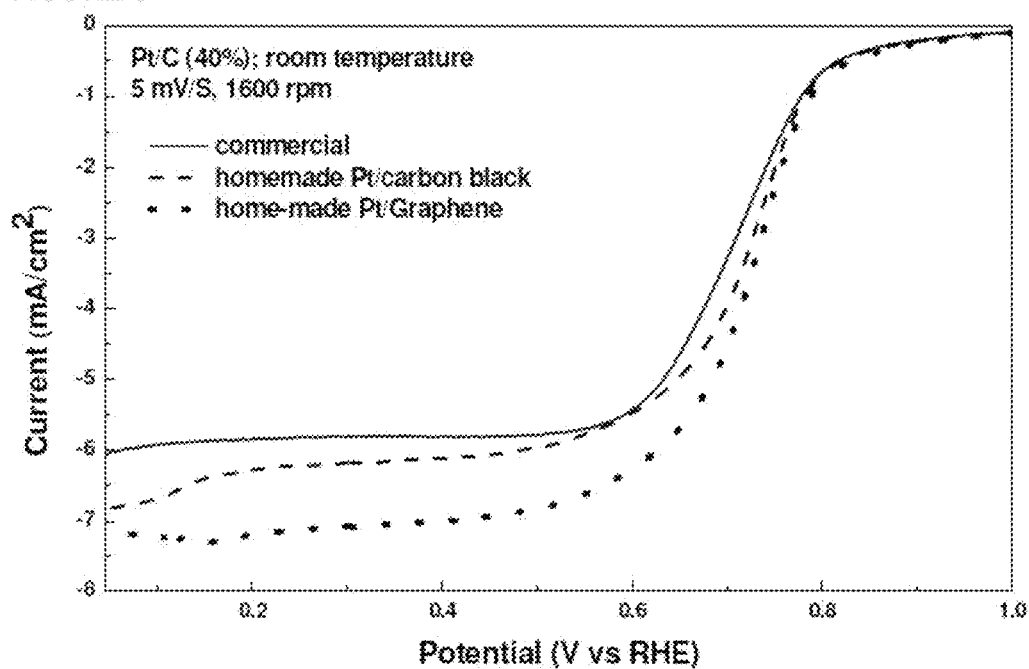
FIG. 6 shows electrochemical testing (rotating disc electrode, RDE) of Pt/C samples in oxygen-saturated 0.1 M $HClO_4$ supporting electrolyte at 25° C.

Example 7: Electrochemical Testing of Catalyst Samples 5 mg of supported Pt catalyst prepared by this method was dispersed in 1.0 ml ethanol to get catalyst ink in ultrasonic bath for 20 min. 50 μL Nafion alcohol solution (5% wt Nafion) was added into the ink, followed by ultrasonic oscillations for another 30 min. 20 μL catalyst ink was placed in the graphite disk electrode and dried in oven at 75° C. for 15 min to prepare working electrode. The electrochemical testing was conducted in a 4-neck electrochemical cell containing 0.1 M $HClO_4$ solution as supporting electrolyte, Ag/AgCl as reference electrode and platinum wire as counter electrode. The electrolyte was saturated by bubbling oxygen into solution and the potential was swept from 1.15 V to 0 V. The rotating disk electrode (RDE) testing results at 1,600 rpm are shown in FIG. 6, from which it can be seen that the catalysts prepared by this invented procedure are superior to commercial counterpart.

The current data at 0.85 V was selected to compare the catalyst activity towards oxygen reduction reaction (ORR) and included in Table 1.

TABLE 1

| | characterization summary of TEM and RDE testing results. | |
|---|---|---|
| Sample | Average particle sizes (TEM) | Current @ 0.85 V (RDE) |
| Pt/C (40% wt, commercial) | 2.30 | 1.72 mA/mg Pt |
| Pt/C-c (40% wt) | 1.81 | 1.85 mA/mg Pt |
| Pt/Graphene (40% wt) | 1.85 | 2.04 mA/mg Pt |

The invention claimed is:

1. A method for forming noble metal nanoparticles on a support, comprising:
   mixing a support ink with one or more noble metal precursor solutions, wherein the support ink comprises a solution of a first polyhydric alcohol and the support, wherein the one or more noble metal precursor solutions comprise a solution of a second polyhydric alcohol and one or more noble metal precursors;
   feeding the mixture of the support ink and the one or more noble metal precursor solutions to a spiral glass tube reactor; and
   heating the spiral glass tube reactor containing the mixture of the support ink and the one or more noble metal precursor solutions to reduce the one or more noble metal precursors to form noble metal nanoparticles on the support,
   wherein during heating the spiral glass tube reactor, a region of the spiral glass tube reactor is selectively heated;
   and wherein an average size of the noble metal nanoparticles is greater than about 1.7 nm and no more than 2 nm,
   and a loading of the noble metal nanoparticles on the support is at least 40 wt %, wherein the loading is based on the total mass of the noble metal nanoparticles and the support.

2. The method according to claim 1, wherein heating comprises exposing the spiral glass tube reactor to microwave heat or millimeter waves.

3. The method according to claim 2, wherein heating comprises exposing the spiral glass tube reactor to microwave heat at 100° C. to 200° C.

4. The method according to claim 3, wherein heating comprises exposing the spiral glass tube reactor to microwave heat at 150° C.

5. The method according to claim 1, wherein the one or more noble metal precursor solutions further comprise a polybasic carboxylic acid.

6. The method according to claim 5, wherein the polybasic carboxylic acid comprises citric acid, tartaric acid, malic acid, oxalic acid, or their salts.

7. The method according to claim 6, wherein the polybasic carboxylic acid comprises citric acid or a citrate of sodium or potassium.

8. The method according to claim 1, wherein the solution of the first polyhydric alcohol and the solution of the second polyhydric alcohol are the same.

9. The method according to claim 8, wherein the first polyhydric alcohol and the second polyhydric alcohol each comprises ethylene glycol.

10. The method according to claim 1, further comprising adding a base solution to the mixture of the support ink and the one or more noble metal precursor solutions prior to feeding the mixture to the spiral glass tube reactor.

11. The method according to claim 10, wherein the base solution comprises a hydroxide of sodium or potassium.

12. The method according to claim 1, wherein the noble metal nanoparticles comprise nanoparticles of platinum, ruthenium, palladium, gold, silver, rhenium, rhodium, iridium, osmium, or a combination thereof.

13. The method according to claim 12, wherein the one or more noble metal precursors comprise an oxide, a halide, a nitrite, a sulphate, or a complex of platinum, ruthenium, palladium, gold, silver, rhenium, rhodium, iridium, osmium, or a combination thereof.

14. The method according to claim 1, wherein the support comprises one or more carbon materials selected from the group consisting of carbon black, carbon nanotube, carbon fibre, graphene, graphite, and carbon mesosphere.

15. The method according to claim 1, further comprising filtering and drying the thus-formed supported noble metal nanoparticles.

16. The method according to claim 1, wherein the loading of the noble metal nanoparticles on the support is up to about 75 wt %.

* * * * *